(12) United States Patent
Basso et al.

(10) Patent No.: US 6,385,060 B1
(45) Date of Patent: May 7, 2002

(54) SWITCHING POWER SUPPLY WITH REDUCED ENERGY TRANSFER DURING A FAULT CONDITION

(75) Inventors: Christophe Basso, Pibrac (FR); Josef Halamik, Roznov (CZ); Roman Urban, Trnava (SK)

(73) Assignee: Semiconductor Components Industries LLC, Phoenix, AZ (US)

(*) Notice: Subject to any disclaimer, the term of this patent is extended or adjusted under 35 U.S.C. 154(b) by 0 days.

(21) Appl. No.: 09/745,558

(22) Filed: Dec. 21, 2000

(51) Int. Cl.⁷ .............................................. H02M 3/335
(52) U.S. Cl. .................. 363/21.15; 363/21.07; 363/21.11; 363/21.18; 363/97
(58) Field of Search ......................... 363/21.01, 21.05, 363/21.07, 21.1, 21.11, 21.13, 21.15, 21.18, 95, 97

(56) References Cited

U.S. PATENT DOCUMENTS

| | | | | |
|---|---|---|---|---|
| 4,679,132 A | * | 7/1987 | Jirka | 363/21 |
| 4,916,569 A | | 4/1990 | Konopka | 361/18 |
| 5,029,269 A | * | 7/1991 | Elliott et al. | 363/21 |
| 5,390,101 A | * | 2/1995 | Brown | 363/20 |
| 5,502,633 A | * | 3/1996 | Miyazaki et al. | 363/95 |
| 5,561,576 A | | 10/1996 | Baldwin | 361/141 |
| 5,764,461 A | | 6/1998 | Wu | 361/18 |
| 5,818,670 A | | 10/1998 | Ahn | 361/18 |
| 6,088,244 A | * | 7/2000 | Shioya et al. | 363/97 |
| 6,118,675 A | * | 9/2000 | Lionetto et al. | 363/21 |
| 6,137,702 A | * | 10/2000 | Hall et al. | 363/95 |
| 6,285,569 B1 | * | 9/2001 | Hall et al. | 363/21.15 |

FOREIGN PATENT DOCUMENTS

| | | | | |
|---|---|---|---|---|
| EP | 0740385 | 10/1996 | | H02H/7/12 |
| JP | 5030735 | 3/1993 | | H02M/3/28 |
| JP | 9107630 | 4/1995 | | H02H/7/20 |
| WO | 0014841 | 3/2000 | | H02H/3/05 |

* cited by examiner

Primary Examiner—Jeffrey Sterrett

(57) ABSTRACT

A switching regulator (18) for use in a switching power supply (10) detects a fault condition by looking for presence of feedback signals during a timer period. If feedback is present but less than a threshold value during the timer period, then the switching power supply (10) is operating normally. If feedback is not present during the timer period, then the switching power supply is in a fault condition. One way of implementing the timer is to charge and discharge by-pass capacitor (23). The timer period is the time for the $V_{CC}$ voltage to drop from a maximum value to a predetermined threshold. When a fault is detected, the gate drive signal from the switching regulator is disabled for a period of time before attempting auto-restart.

22 Claims, 4 Drawing Sheets

SWITCHING POWER SUPPLY WITH REDUCED ENERGY TRANSFER DURING A FAULT CONDITION

BACKGROUND OF THE INVENTION

The present invention relates in general to integrated circuits and, more particularly, to a switching power supply regulator.

Most if not all electronic devices require a DC voltage of appropriate level for proper operation. The DC voltage is derived from an AC power source, e.g. by plugging a power supply into a wall socket. The AC voltage available at the wall socket is converted to a DC bulk voltage by a full-wave rectifier diode bridge. The DC bulk voltage is further converted to a regulated DC output voltage by a switching power supply.

The switching power supply uses a transformer, or an inductor depending on the configuration, as an energy transfer element. For example, a flyback-type power supply has a power transistor coupled to one side of the primary winding of a transformer. The power transistor turns on and off as determined by a switching regulator circuit to alternately store energy in the magnetic field of the transformer and transfer the stored energy to the secondary winding. The secondary winding of the transformer develops a rectified output voltage across a shunt capacitor coupled across the secondary winding as a function of the energy transfer. The voltage across the capacitor provides the DC output voltage of the switching power supply.

The DC output voltage increases and decreases inversely with the applied load. An increasing load decreases the DC output voltage and a decreasing load increases the DC output voltage. The DC output voltage, or a representation thereof, is fed back to the switching regulator circuit to allow the switching power supply to compensate for load variation. As the load increases, the DC output voltage decreases which causes the switching regulator to leave the power transistor on for a longer average period of time in order to store more energy in the magnetic field. The additional energy is transferred to the secondary winding during the off time of the power transistor to supply the increased load and re-establish the DC output voltage. As the load decreases, the DC output voltage increases which causes the switching regulator to leave the power transistor on for a shorter average period of time to store less energy in the magnetic field. The reduced energy transfer to the secondary winding during the off time of the power transistor causes the power supply to adjust to the decreased load and reduces the DC output voltage back to its steady-state value.

A typical prior art switching regulator circuit generates a pulse width modulated control signal, or a fixed frequency, fixed duty cycle control signal which is enabled or disabled for one or more cycles in response to the feedback signal. The switching regulator generates a drive signal from the control signal to turn the power transistor on and off in order to regulate the DC output voltage across the output terminals of the switching power supply.

Many switching regulators cannot detect an overload or fault condition. A fault condition occurs when the output load exceeds the maximum rating of the power converter. A fault includes a short-circuit across the output terminals of the power supply. In a fault condition, the DC output voltage drops below its average value under nominal loading. Prior art switching regulators generally interpret a drop in the DC output voltage as an indication to supply more power to the output and bring the DC output voltage back up to its nominal value. However, supplying more power into a fault, overload, or short circuit is a safety hazard and can damage the switching power supply and/or the load itself.

Another problem experienced by prior art switching power supplies involves loss of feedback. One common feedback scheme uses an opto-isolator to monitor the DC output voltage and provide feedback information to the switching regulator. The switching regulator tends to push the DC output voltage to a maximum value absent any feedback. The feedback information operates to inhibit or disable the switching regulator as necessary to maintain the DC output voltage at a regulation threshold. If the phototransistor in the opto-isolator should fail or the feedback signal is otherwise lost, then the switching power supply would continuously deliver maximum power to load. The loss of feedback information is another fault condition that can damage the power supply and/or the load.

Hence, a need exists for a switching regulator circuit which can detect a fault condition and reduce the energy transfer to the load.

DETAILED DESCRIPTION OF THE PREFERRED EMBODIMENT

Figure 1:
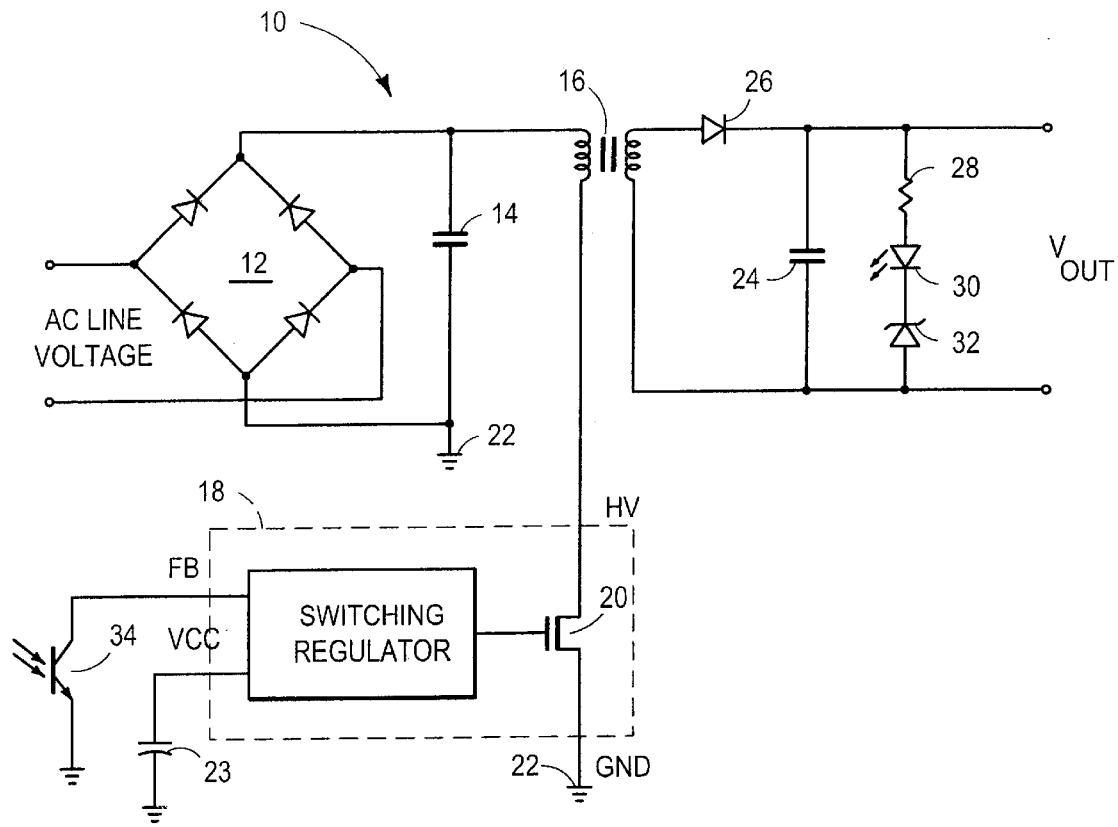
FIG. 1 illustrates a switching power supply using secondary side regulation.

Referring to FIG. 1, a switching power supply 10 is shown receiving an AC line voltage. The AC line voltage is converted to a DC bulk voltage by full-wave rectifier diode bridge 12. Capacitor 14 filters the DC bulk voltage. The primary winding of transformer 16 receives the DC bulk voltage. Regulator circuit 18 is implemented as an integrated circuit (IC) using conventional high voltage IC manufacturing processes. The IC package has at least three pins, one of which is a feedback (FB) pin connected as the feedback input to the switching regulator. A second high voltage (HV) pin is connected to the drain of power switching transistor 20 for coupling to a high voltage on the primary winding of transformer 16. Power transistor 20 conducts an inductor current through the primary winding of transformer 16. A third ground (GND) pin is coupled to power supply conductor 22 operating at circuit ground potential. An optional fourth pin (VCC) of the IC package is coupled to capacitor 23 for providing a positive power supply to the IC. Capacitor 23 can be coupled to the VCC pin external to the IC, or capacitor 23 can be internally coupled to a terminal of the IC.

Power transistor 20 operates on regulation cycles controlled by switching regulator 18. When power transistor 20 conducts in a flyback configuration, an inductor current flows through the primary winding and stores energy in the magnetic field of transformer 16. When power transistor 20 is non-conductive, the energy stored in the magnetic field is transferred to the secondary winding. Capacitor 24 is coupled with diode 26 across the secondary winding of transformer 16 to develop a DC output voltage $V_{OUT}$. Diode 26 prevents current flow back into the secondary winding.

A current flows through resistor 28, LED 30, and zener diode 32 under nominal operating conditions. Optical lightemitting diode (LED) 30 and photo-detection transistor 34 operate as an optical isolator to electrically isolate and optically couple analog feedback information from capacitor 24 to the FB pin of switching regulator IC 18. If LED 30 is forward biased, then a current flowing through LED 30 generates a quantity of photons proportional to the current flow. The photons are received by the photo-detection base of transistor 34 to render it conductive. The conductivity of transistor 34 is controlled by the current flow through LED 30. Switching regulator 18 controls switching of power transistor 20 in response to the analog nature of the feedback signal to turn transistor 20 on and off as necessary so that more or less energy is transferred to the DC output depending on the DC output voltage to thereby regulate the DC output voltage $V_{OUT}$.

The regulation scheme shown in FIG. 1 is commonly called secondary side regulation because the feedback information is generated on the secondary side of the transformer. The present invention is also applicable to other feedback schemes including primary side sensing where another auxiliary winding (not shown) is used to generate the feedback signal. The present invention is also applicable to other switching regulators including pulse width modulators which operate on a fixed frequency and vary the pulse width according to the feedback signal.

Figure 2:
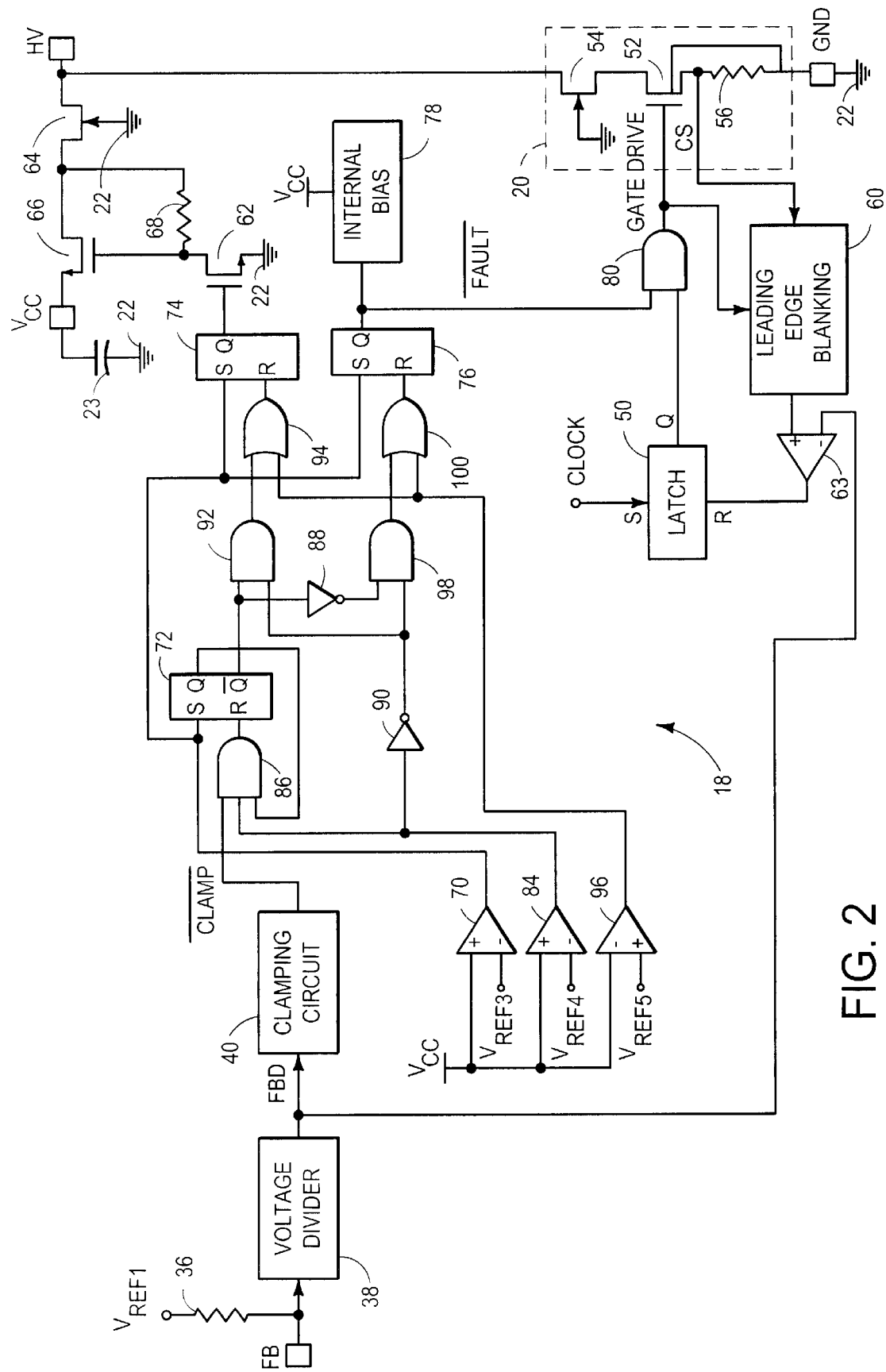
FIG. 2 illustrates the switching regulator of FIG. 1.

Turning to FIG. 2, switching regulator 18 is shown with further detail. The feedback signal is received on the FB pin. Resistor 36 pulls up on the FB pin to $V_{REF1}$ when transistor 34 is non-conductive. The feedback signal is divided down by voltage divider 38 to provide a divided down feedback signal FBD. Voltage divider 38 may be implemented with a resistor divider network. Clamping circuit 40 provides an active low $\overline{CLAMP}$ signal when FBD exceeds an internal threshold. When FBD is less then the internal threshold of clamping circuit 40, then $\overline{CLAMP}$ is logic high.

Power transistor 20 as shown in FIG. 1 is a simplified representation of what in reality is two separate devices, i.e. a low voltage MOSFET 52 and a high voltage JFET 54. The gate drive signal controls MOSFET 52 to conduct the inductor current from the HV pin. JFET 54 provides high voltage isolation from the HV pin for the low voltage MOSFET 52.

JFET 54 has a drain coupled to the HV pin to conduct inductor current from the primary side of transformer 16 through MOSFET 52. A first source of MOSFET 52 is coupled to the GND pin to conduct the majority of the inductor current. A second source of MOSFET 52 is coupled through current sense resistor 56 to the GND pin. The voltage across resistor 56 is a current sense (CS) signal indicative of the current through MOSFET 52 that is fed back to leading edge blanking (LEB) circuit 60. Further detail of LEB circuit 60 is disclosed in U.S. Pat. No. 5,418,410 and hereby incorporated by reference. Briefly, LEB circuit 60 inhibits feeding back the current sense signal during a portion of the rising edge of the gate drive signal to MOSFET 52. LEB circuit 60 monitors the gate drive signal and passes the current sense signal when the rising edge of the gate drive signal exceeds a Miller plateau voltage as determined by the characteristics of MOSFET 52 and the applied DC bulk voltage.

Latch 50 and AND gate 80 generate a gate drive signal in response to a CLOCK signal and the CS signal as compared to the FBD signal. CLOCK provides a continuous pulse train operating at say 100 KHz. A logic one CLOCK signal sets latch 50 so that its Q-output is logic one. Assuming $\overline{FAULT}$ is logic one, gate drive goes high which turns on transistor 52 and conducts current through resistor 56. Comparator 63 determines when CS exceeds the value of FBD. When the output of comparator 63 goes high, latch 50 is reset and its Q-output goes to logic zero to turn off transistor 52.

Figure 4:
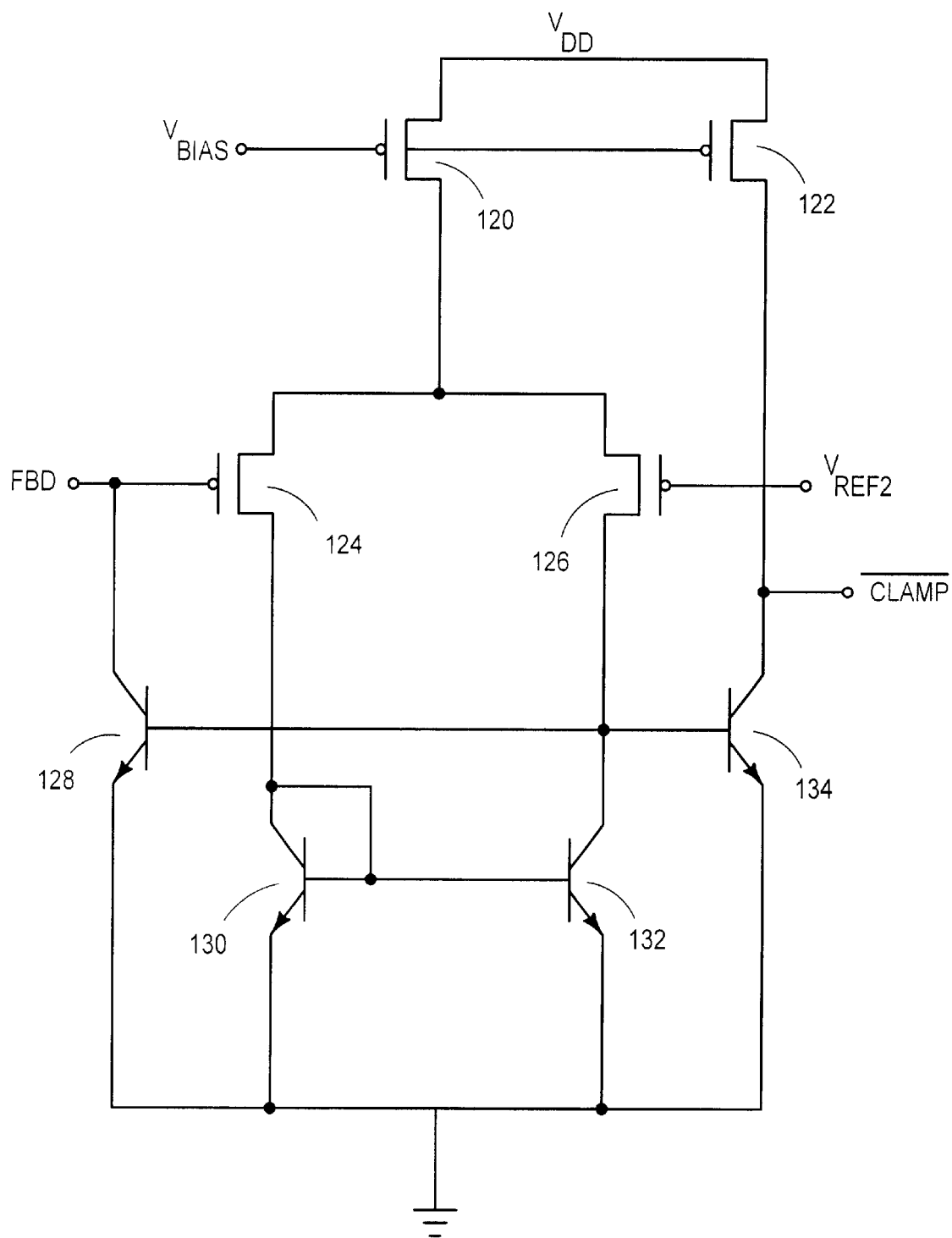
FIG. 4 illustrates the clamping circuit of FIG. 2.
Figure 5:
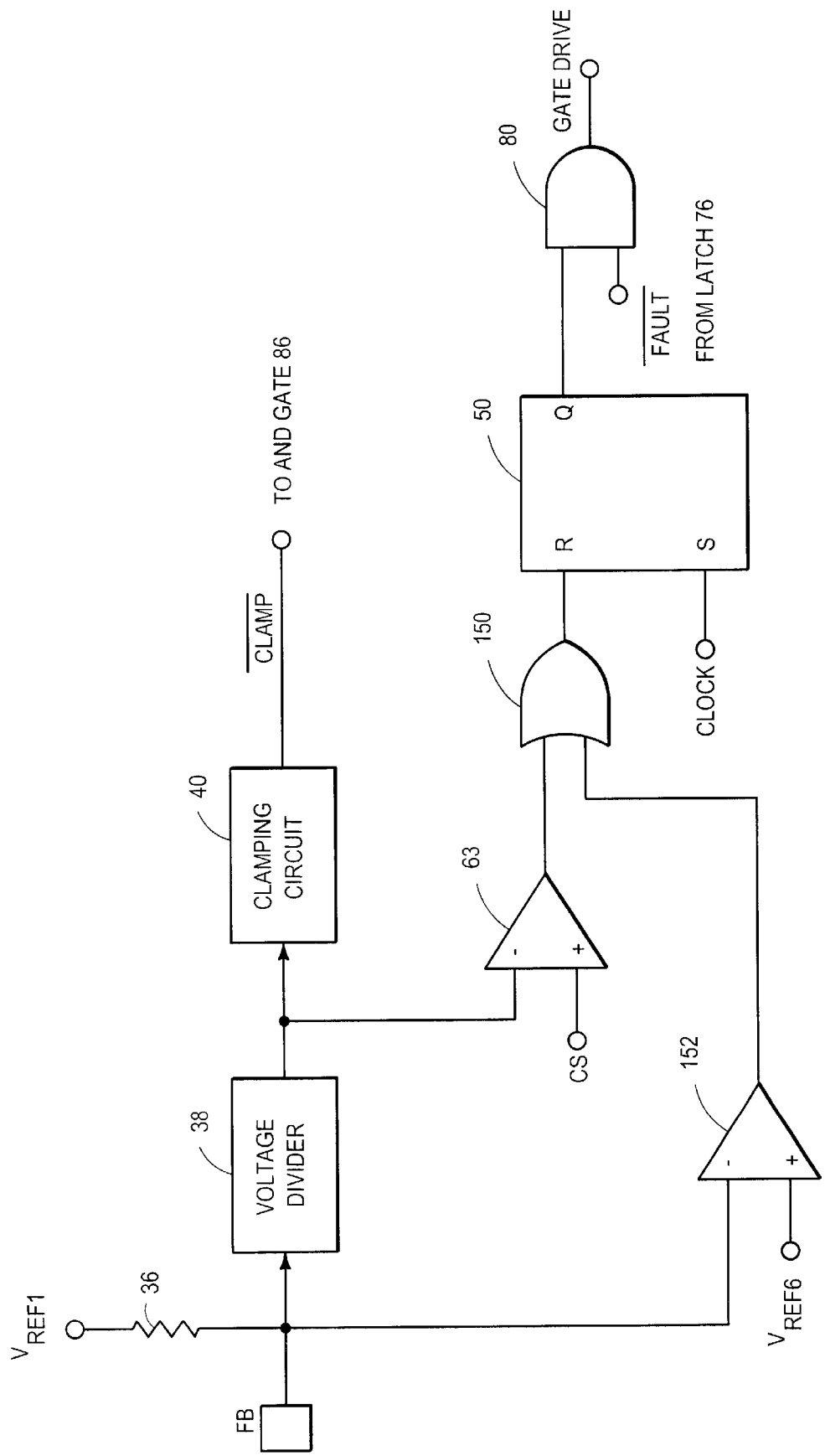
FIG. 5 illustrates an alternate portion of the switching regulator of FIG. 2.

Clamping circuit 40 is shown in FIG. 4 comprising MOSFET transistors 120–126 and bipolar transistors 128–134. Clamping circuit 40 receives FBD as an input and asserts the $\overline{CLAMP}$ signal as an output. A reference voltage $V_{REF2}$ sets the voltage level, or threshold, at which FBD will be clamped by clamping circuit 40.

The voltages $V_{DD}$ and $V_{BIAS}$ are internal voltages generated from $V_{CC}$ by internal circuitry (not shown) on switching regulator 18. Voltage $V_{BIAS}$ is used to control transistors 120 and 122 which operate as constant current sources. Transistors 124 and 126 form a differential pair which compare FBD and the reference voltage $V_{REF2}$. Transistors 130 and 132 operate as a current mirror. As long as FBD is less than the reference voltage $V_{REF2}$, transistor 124 is turned on and transistor 126 is turned off. As a result, transistor 132 is turned on and both transistors 128 and 134 are turned off. In this normal state of operation, FBD is free to range from 0 to $V_{REF2}$ and $\overline{CLAMP}$ is pulled to a logic high voltage by transistor 122.

When FBD attempts to rise above $V_{REF2}$, transistor 126 is turned on and transistor 124 is turned off. As a result, transistor 134 is turned on to pull $\overline{CLAMP}$ to a logic low voltage and transistor 128 is turned on sufficiently to hold FBD to substantially the same value as $V_{REF2}$. The clamping circuit 40 thus performs the dual function of clamping the level of FBD which is applied to comparator 63 to provide a current limit on the operation of power supply 10, and it signals regulator 18 through the $\overline{CLAMP}$ signal that it is in the clamped, current overload state. Circuitry shown in FIG. 2 detects an active low $\overline{CLAMP}$ signal sets $\overline{FAULT}$ accordingly to enable or disable the drive signal.

Figure 3:
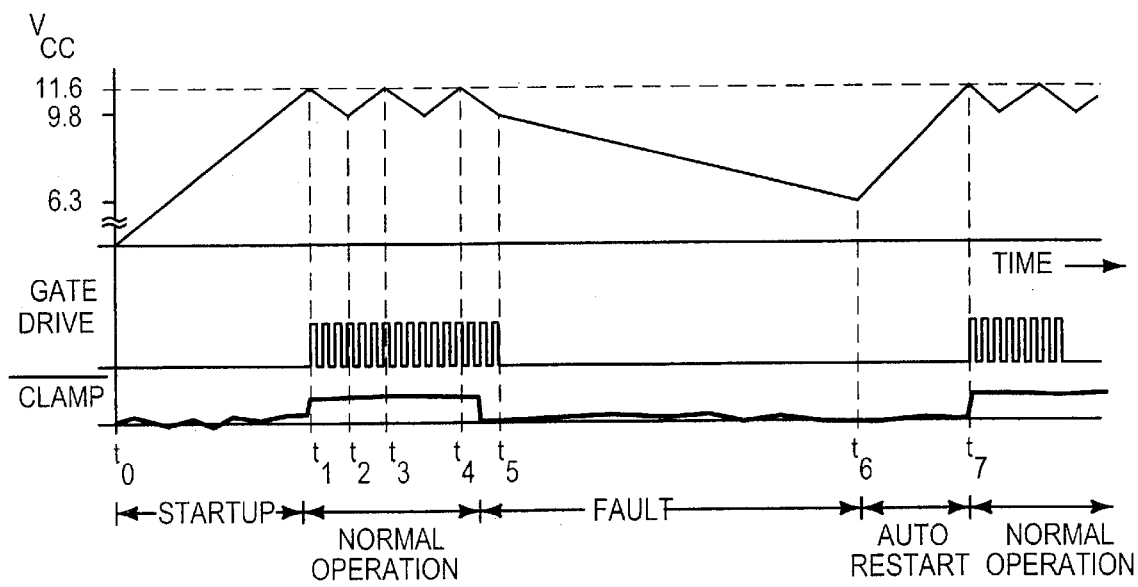
FIG. 3 illustrates a waveform plot useful in the explanation of FIG. 2.

Turning to FIG. 3, a waveform plot is shown of startup, normal operation, and fault conditions. At time $t_0$, switching regulator 18 is powered-down. Transistor 62 is initially non-conductive. The DC bulk voltage is applied to the HV pin. JFET 64 is a high voltage device that provides high voltage isolation by separating the HV pin from the low voltage MOSFET 66. MOSFET 66 is biased into conduction by resistor 68. MOSFET 66 conducts a start-up current into capacitor 23 which charges the $V_{CC}$ voltage as shown in FIG. 3.

At time $t_1$, the $V_{CC}$ voltage exceeds the reference voltage $V_{REF3}$ set to 11.6 volts. The output of comparator 70 changes to logic one and sets RS latch 72. Latch 72 is a set dominate latch. The Q-output of latch 72 goes to logic one and its $\overline{Q}$-output goes to logic zero. The logic one from comparator 70 also sets the Q-output of RS latch 74 and RS latch 76 to logic one. Latch 74 is a set dominate latch and latch 76 is a reset dominate latch. The Q-output of latch 76 is the $\overline{FAULT}$ signal that enables internal bias circuit 78 to supply nominal bias voltages and currents to switching regulator 18. The $\overline{FAULT}$ signal from the Q-output of latch 76 is also applied to one input of AND gate 80. AND gate 80 operates as a gate driver to pass or block the gate drive signal from latch 50 to MOSFET 52 in response to the $\overline{FAULT}$ signal. When $\overline{FAULT}$ is logic one, internal bias circuit 78 and AND gate driver 80 are enabled. When $\overline{FAULT}$ is logic zero, internal bias circuit 78 is reduced to low power mode and gate driver 80 is disabled. The Q-output of latch 74 turns on transistor 62 which turns off MOSFET 66. The start-up current is shut off and the $V_{CC}$ voltage begins to fall as capacitor 23 is supplying power to operate switching regulator 18.

A feature of the present invention is to detect an overload or fault condition and disable the gate drive signal. It is unsafe and potentially damaging for switching regulator 18 to switch continuously and transfer energy to the DC output of switching power supply 10 during a fault condition. During normal operation, switching regulator 18 receives the feedback signal at regular intervals. This is a normal consequence of regulating the DC output voltage. If switching power supply 10 is not in a fault condition, then at some point sufficient energy is transferred to the DC output that the DC output voltage enables LED 30 to control transistor 34 so as to provide a feedback signal. If switching regulator 18 does not receive a feedback signal while continuing to switch the gate drive signal for a period of time, then switching power supply 10 is determined to be in a fault condition. The absence of a feedback signal implies that current is not flowing through LED 30 and transistor 34 is not operating in its linear range. Resistor 36 pulls the FB pin to a high value and the value of FBD will be greater than $V_{REF2}$.

The fault is detected by switching regulator 18 setting a timer. If FBD exceeds the internal threshold value $V_{REF2}$ of clamping circuit 40, i.e. $\overline{CLAMP}$ logic zero, at the end of the timer period, then switching power supply 10 is determined to be in a fault condition. Once an fault is detected, switching regulator 18 disables the gate drive signal for a period of time and then enters an auto-restart mode to determine if the fault has been removed and to return to normal operation. If the fault is no longer present, then auto-restart results in switching regulator 18 resuming normal operation. If the fault is still present, then switching regulator 18 again detects the fault and disables the gate drive signal for another period of time. Switching regulator 18 continues the process of auto-restart and fault detection until the fault is removed and normal operation may resume.

In FIG. 2, the timer function is provided by charging the $V_{CC}$ voltage on capacitor 23 to 11.6 volts and then allowing it to discharge to 9.8 volts. The time period to discharge capacitor 23 based on average power consumption of switching regulator 18 is about 100 milliseconds for a capacitor 23 value of 20 microfarads. The timer period is programmable and set by the value of capacitor 23 and the value of the reference voltages to the comparators. The timer period should be longer than the time required for capacitor 24 to reach nominal operating voltage during start-up.

The timer sequence during normal operation proceeds as follows. Starting at time $t_1$, MOSFET 66 has charged the $V_{CC}$ voltage on capacitor 23 to 11.6 volts. After time $t_1$, the $V_{CC}$ voltage begins to fall as shown in FIG. 3 as switching regulator 18 consumes power from capacitor 23. The Q-output of latch 72 is logic one. The reference voltage $V_{REF4}$ is set to 9.8 volts. The $V_{CC}$ voltage is greater than the reference voltage $V_{REF4}$ so the output of comparator 84 is logic one. AND gate 86 receives the logic one from the Q-output of latch 72 and the logic one from comparator 84.

If the $\overline{CLAMP}$ is logic one, indicating feedback operating normally, anytime before the $V_{CC}$ voltage falls to 9.8 volts at time $t_2$, then the output of AND gate 86 goes to logic one and resets latch 72. The combination of AND gate 86 and latch 72 operates as a detector to detect a valid feedback signal. During each timer period, $\overline{CLAMP}$ must remain logic one for normal operation to continue.

When latch 72 is reset, the $\overline{Q}$-output of latch 72 goes to logic one. The output of inverter 88 goes to logic zero. As the $V_{CC}$ voltage falls below 9.8 volts, the output of comparator 84 switches to logic zero and the output of inverter 90 goes to logic one. The output of AND gate 92 goes to logic one and the output of OR gate 94 goes to logic one. The logic one from OR gate 94 resets latch 74 and turns off transistor 62. MOSFET 66 turns on and sources current to charge capacitor 23. The $V_{CC}$ voltage rises back up to 11.6 volts at time $t_3$ and the timer cycle repeats.

Optionally, the connection between Q-output of latch 72 and the input of AND gate 86 can be eliminated in which case the occurrence of a logic zero $\overline{CLAMP}$ during the timer period but not present at the end of the timer period will not be detected.

Comparator 96 compares the $V_{CC}$ voltage with the reference voltage $V_{REF5}$ set to 6.3 volts. Since the $V_{CC}$ voltage does not drop below 9.8 volts during normal operation the output of comparator 96 remains at logic zero. AND gate 98 receives a logic zero from inverter 90 before the $V_{CC}$ voltage drops to 9.8 volts and/or a logic zero from inverter 88 after $\overline{CLAMP}$ goes to logic one. During normal operation, the output of AND gate 98 is logic zero, the output of OR gate 100 is logic zero, and latch 76 is not reset. The $\overline{FAULT}$ signal remains at logic one. Internal bias circuit 78 remains operating and AND gate 80 continues to pass the gate drive signal to MOSFET 52.

Assume a fault condition occurs at time $t_4$ as shown in FIG. 3. No feedback signal is present between time $t_4$ and time $t_5$ because the DC output is faulted or because no feedback information is delivered because of an opto-isolator fault. Switching regulator 18 continues to switch MOSFET 52 between times $t_4$ and $t_5$ in an attempt to get the DC output voltage back to its regulation value. However, the fault condition prevents the DC output voltage from rising to its regulation threshold or otherwise inhibits any valid feedback signals. Transferring energy in a faulted condition is not safe and may result in damage to switching power supply 10 or its load.

At time $t_4$, latches 72, 74, and 76 are set as described above. By time $t_5$, latch 72 has not been reset by a logic one $\overline{CLAMP}$ signal. The $\overline{Q}$-output of latch 72 is logic zero, the output of AND gate 92 is logic zero, and the output of inverter 88 is logic one. Latch 74 is not reset to turn off transistor 62. MOSFET 66 does not turn on to re-charge capacitor 23. The $V_{CC}$ voltage continues to fall past time $t_5$. When the output of comparator 84 switches to logic zero, the output of inverter 90 goes to logic one and the output of AND gate 98 goes to logic one. The output of OR gate 100 goes to logic one and resets latch 76. The $\overline{FAULT}$ signal goes to logic zero to disable internal bias circuit 78 or set it to a low power mode, and further disable AND gate 80 from passing any gate drive signals to MOSFET 52. AND gate 80 blocks the gate drive signal when the $\overline{FAULT}$ signal is logic zero. The $V_{CC}$ voltage falls at a slower rate with internal bias circuit 78 switched to a low power mode. Notice there are no gate drive signals from time $t_5$ to time $t_7$ in FIG. 3. Switching regulator 18 has detected switching power supply 10 to be in a fault condition because no feedback signal is received in the timer period. Switching regulator 18 enters a shutdown mode to discontinue transferring energy to the DC output.

The $V_{CC}$ voltage continues to decline until it falls below the reference voltage $V_{REF5}$ at time $t_6$. At that point, switching regulator 18 enters an auto restart mode. Comparator 96 switches to logic one and the output of OR gate 94 goes to logic one to reset latch 74. The output of OR gate 100 is logic one. Transistor 62 turns off to release the gate of MOSFET 66. MOSFET 66 conducts a charging current to capacitor 23 to bring the $V_{CC}$ voltage back up to 11.6 volts.

When the $V_{CC}$ voltage reaches 11.6 volts, the output of comparator 70 goes to logic one to set latches 72, 74, and 76. Internal bias circuit 78 and AND gate 80 are enabled. Switching regulator 18 proceeds with normal operation.

If the fault condition is still present, then no feedback signal is present in the next timer period starting at time $t_7$. In that case, switching regulator 18 enters shutdown mode again at the end of the timer period as described above.

The embodiment shown in FIG. 2 uses the discharge rate of the $V_{CC}$ voltage on capacitor 23 as a timer. This embodiment offers a number of advantages. There is low average power output during a fault because switching is disabled. Operating internal bias circuit 78 in a low power mode during a fault condition extends the off time to achieve even lower average output power and further reduces power consumption. Sweeping the $V_{CC}$ voltage from 9.8 to 11.6 volts can be used to spread the switching frequency spectrum over a wider range and reduce electromagnetic interference (EMI) and the need for costly EMI filtering circuitry. The timer is programmable by selecting the value and effective the charge and discharge rate of capacitor 23 and by selection of the reference voltages to the comparators. The switching regulator provides protection for soft faults (loading beyond maximum load), hard faults (short circuit), and feedback faults. The present invention does not require an auxiliary winding in the switching power supply for powering the switching regulator. The switching regulator operates over a wide range of DC bulk voltages.

In some applications, it may be desirable not to auto-restart. Once a fault is detected and the switching regulator is shutdown, the user would need to take affirmative action to restart the switching power supply. For example, the user may press a restart button or the user may need to completely remove AC line input voltage from the switching power supply before normal operation can resume.

The timer can be implemented in a variety of ways. For example, the timer may be implemented as a counter that counts up or counts down at a known frequency. One output of the counter, corresponding to the output of comparator 70 in the $V_{CC}$ capacitor timer implementation, generates a logic one at the beginning of the count sequence to set latches 72, 74, and 76 to start the timer period. At a later count value, a second output of the counter, corresponding to the output of comparator 84 in the $V_{CC}$ capacitor timer implementation, goes to logic one to end the timer period. If latch 72 has detected a feedback signal during the timer period, then switching regulator 18 continues normal operation. If latch 72 is not reset in the timer period, then switching regulator 18 shuts down and waits a period of time before attempting auto-restart. At an even later count value, a third output of the counter, corresponding to the output of comparator 96 in the $V_{CC}$ capacitor timer implementation, goes to logic one to initiate auto-restart.

Resetting the timer period each time feedback signals are present also works when the $V_{CC}$ voltage is used to generate the timer period. In that case, the timer period is determined by the time for the $V_{CC}$ voltage to drop from a peak value to a detection threshold. The timer period is reset by re-charging the $V_{CC}$ voltage to the peak value each time the $\overline{\text{CLAMP}}$ goes to logic one. As long as the $V_{CC}$ voltage remains above a detection threshold, then the switching power supply is in normal operation. If the feedback signal is not present when the timer period expires, i.e. by the time the $V_{CC}$ voltage falls below the detection threshold, then the switching power supply is determined to be in a fault condition. The switching regulator shuts down and waits a period of time before attempting auto-restart.

FIG. 8 is a partial schematic diagram of an alternative embodiment of regulator 18 that incorporates a skipping mode. Specifically, an OR gate 150 having an output coupled to the reset input of latch 50, a comparator 152, and a voltage reference source $V_{REF6}$ have been added to the control circuit of FIG. 2. The OR gate 150 receives the output of comparator 152 and the output from comparator 63, which compares signal FB to $V_{REF6}$.

In this alternative embodiment, regulator 18 skips switching cycles when the output power demand drops below a given level. This is accomplished by monitoring signal FB from the secondary side of the power supply using comparator 152. As the output power demand decreases to a low power level, FB falls to lower voltage levels. When FB reaches fixed voltage level $V_{REF6}$, for example 1.4V, regulator 18 enters a skipping mode of operation in which a portion of the driving signal pulses are blanked out or disabled. Thus, power transfer now depends on the width of the driver pulse bunches. Specifically, when FB falls below $V_{REF6}$, the output of comparator 152 goes high resetting latch 50 and causing the output Q of latch 50 to go low, disabling the gate drive signal. While output power demand remains low, FB will vary slightly above and below $V_{REF6}$ such that driving signal pulses are enabled when FB rises above $V_{REF6}$ and driving signal pulses are disabled when FB falls below $V_{REF6}$. Once output power demand returns to normal levels, FB rises to higher voltages and regulator 18 again resumes normal operation in which driver signal pulses are continuously generated during normal operation.

What is claimed is:

1. A control circuit, comprising:
   a clamping circuit having an input coupled for receiving an input signal and having an output coupled for asserting a clamp signal if the input signal is clamped by the clamping circuit; and
   a timer having an input coupled for receiving the clamp signal and having an output coupled for providing an output signal if the clamp signal is asserted during a timer period of the timer, wherein the timer includes
   a capacitor having a first conduction terminal coupled for providing a power supply potential, and a second conduction terminal coupled to a power supply conductor, and
   a comparator coupled for receiving the power supply potential, having an input coupled for receiving a reference signal, and an output coupled for providing a control signal.

2. The control circuit of claim 1, wherein the timer further comprises a logic gate having a first input coupled for receiving the clamp signal, a second input coupled to the output of the comparator, and an output coupled for providing the output signal.

3. A control circuit, comprising:
   a clamping circuit having an input coupled for receiving an input signal and having an output coupled for asserting a clamp signal if the input signal is clamped by the clamping circuit, wherein the clamping circuit includes
   a comparator stage having an input coupled for receiving the input signal,
   an output stage coupled for asserting the clamp signal, having an input coupled to an output of the comparator stage, and
   a signal limiter coupled for clamping the input signal, having an input coupled to the output of the comparator stage; and
   a timer having an input coupled for receiving the clamp signal and having an output coupled for providing an output signal if the clamp signal is asserted during a timer period of the timer.

4. The control circuit of claim 3, wherein the comparator stage comprises:
   a first transistor having a control terminal coupled for receiving the input signal; and
   a second transistor having a control terminal coupled for receiving a reference signal, a first conduction terminal commonly coupled to a first conduction terminal of the first transistor and further coupled to a first power supply conductor, and a second conduction terminal coupled to the input of the output stage.

5. The control circuit of claim 4, wherein the first and second transistors are P-channel MOS transistors.

6. The control circuit of claim 4, wherein the comparator stage further comprises a current mirror having an input coupled to a second conduction terminal of the first transistor and an output coupled to the input of the output stage.

7. The control circuit of claim 6, wherein the current mirror comprises:
   a third transistor having a first conduction terminal coupled to the second conduction terminal of the first transistor and to a control terminal of the third transistor, and a second conduction terminal coupled to a second power supply conductor; and
   a fourth transistor having a control terminal coupled to the control terminal of the third transistor, a first conduction terminal coupled to the input of the output stage, and a second conduction terminal coupled to the second power supply conductor.

8. The control circuit of claim 3, wherein the output stage comprises a transistor having a control terminal coupled to the output of the comparator stage, a first conduction terminal coupled to a first power supply conductor and to the output of the clamping circuit for asserting the clamp signal, and a second conduction terminal coupled to a second power supply conductor.

9. The control circuit of claim 3, wherein the signal limiter comprises a transistor having a first conduction terminal coupled to the input of the comparator stage for clamping the input signal, a control terminal coupled to the output of the comparator stage, and a second conduction terminal coupled to a first power supply conductor.

10. A regulator circuit coupled for sensing a voltage across a secondary winding having an input coupled for receiving a feedback signal, comprising;
    a clamping circuit having an input coupled for receiving the feedback signal and an output coupled for asserting a clamp signal;
    a timer circuit coupled to a power supply terminal, having an input coupled for receiving the clamp signal and an output coupled for providing a first control signal if the clamp signal is asserted during a timer period of the timer circuit; and
    a driver circuit coupled for providing a drive control signal, having a first input coupled for receiving the feedback signal, and a second input coupled for receiving the first control signal.

11. The regulator circuit of claim 10, wherein the driver circuit comprises:
    a detection circuit having a first input coupled for receiving the feedback signal, a second input coupled for receiving the first control signal, and an output coupled for providing the drive control signal; and
    a switching circuit having an input coupled for receiving the drive control signal and an output coupled for providing a drive feedback signal.

12. The regulator circuit of claim 11, wherein the detection circuit comprises:
    a comparator coupled for receiving the feedback signal, having an input coupled for receiving the drive feedback signal, and an output coupled for providing an output signal;
    a latch coupled for receiving the output signal, having an input coupled for receiving a clock signal, and an output coupled for providing a latch control signal; and
    a logic gate coupled for receiving the first control signal, having an input coupled for receiving the latch control signal, and an output coupled for providing the drive control signal.

13. The regulator circuit of claim 10, wherein the timer circuit comprises a capacitor having a first conduction terminal coupled for providing a power supply potential, and a second conduction terminal coupled to a power supply conductor.

14. The regulator circuit of claim 13, wherein the timer circuit further comprises a comparator coupled for receiving the power supply potential, having an input coupled for receiving a reference signal, and an output coupled for providing a second control signal.

15. The regulator circuit of claim 14, wherein the timer circuit further comprises a logic gate having a first input coupled for receiving the clamp signal, a second input coupled to the output of the comparator, and an output coupled for providing the first control signal.

16. The regulator circuit of claim 10, wherein the clamping circuit further comprises:
    a comparator stage having an input coupled for receiving the feedback signal;
    an output stage coupled for asserting the clamp signal, having an input coupled to an output of the comparator stage; and
    a signal limiter coupled for clamping the feedback signal, having an input coupled to the output of the comparator stage.

17. The regulator circuit of claim 16, wherein the signal limiter comprises a transistor having a first conduction terminal coupled to the input of the comparator stage for clamping the feedback signal, a control terminal coupled to the output of the comparator stage, and a second conduction terminal coupled to a first power supply conductor.

18. The regulator circuit of claim 16, wherein the output stage comprises a transistor having a control terminal coupled to the output of the comparator stage, a first conduction terminal coupled to a first power conductor and to the output of the clamping circuit for asserting the clamp signal, and a second conduction terminal coupled to a second power supply conductor.

19. The regulator circuit of claim 16, wherein the comparator stage comprises:
    a first transistor having a control terminal coupled for receiving the feedback signal; and
    a second transistor having a control terminal coupled for receiving a reference signal, a first conduction terminal commonly coupled to a first conduction terminal of the first transistor and further coupled to a first power supply conductor, and a second conduction terminal coupled to the input of the output stage.

20. The regulator circuit of claim 19, wherein the comparator stage further comprises a current mirror having an input coupled to a second conduction terminal of the first transistor and an output coupled to the input of the output stage.

21. The regulator circuit of claim 20, wherein the current mirror comprises:

a third transistor having a first conduction terminal coupled to the second conduction terminal of the first transistor and to a control terminal of the third transistor, and a second conduction terminal coupled to a second power supply conductor; and a fourth transistor having a control terminal coupled to the control terminal of the third transistor, a first conduction terminal coupled to the input of the output stage, and a second conduction terminal coupled to the second power supply conductor.

22. The regulator circuit of claim 19, wherein the first and second transistors are P-channel MOS transistors.

\* \* \* \* \*